UNITED STATES PATENT OFFICE.

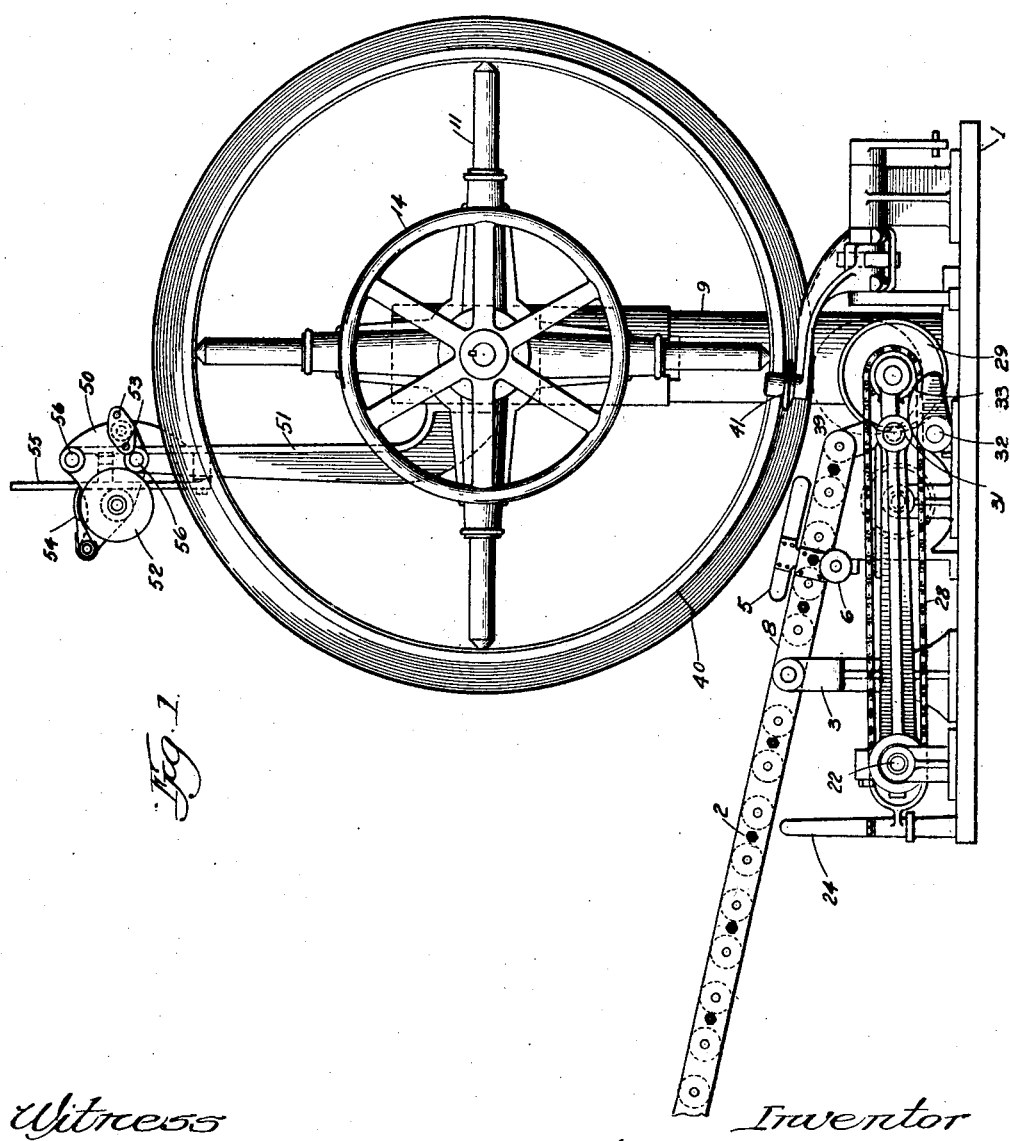

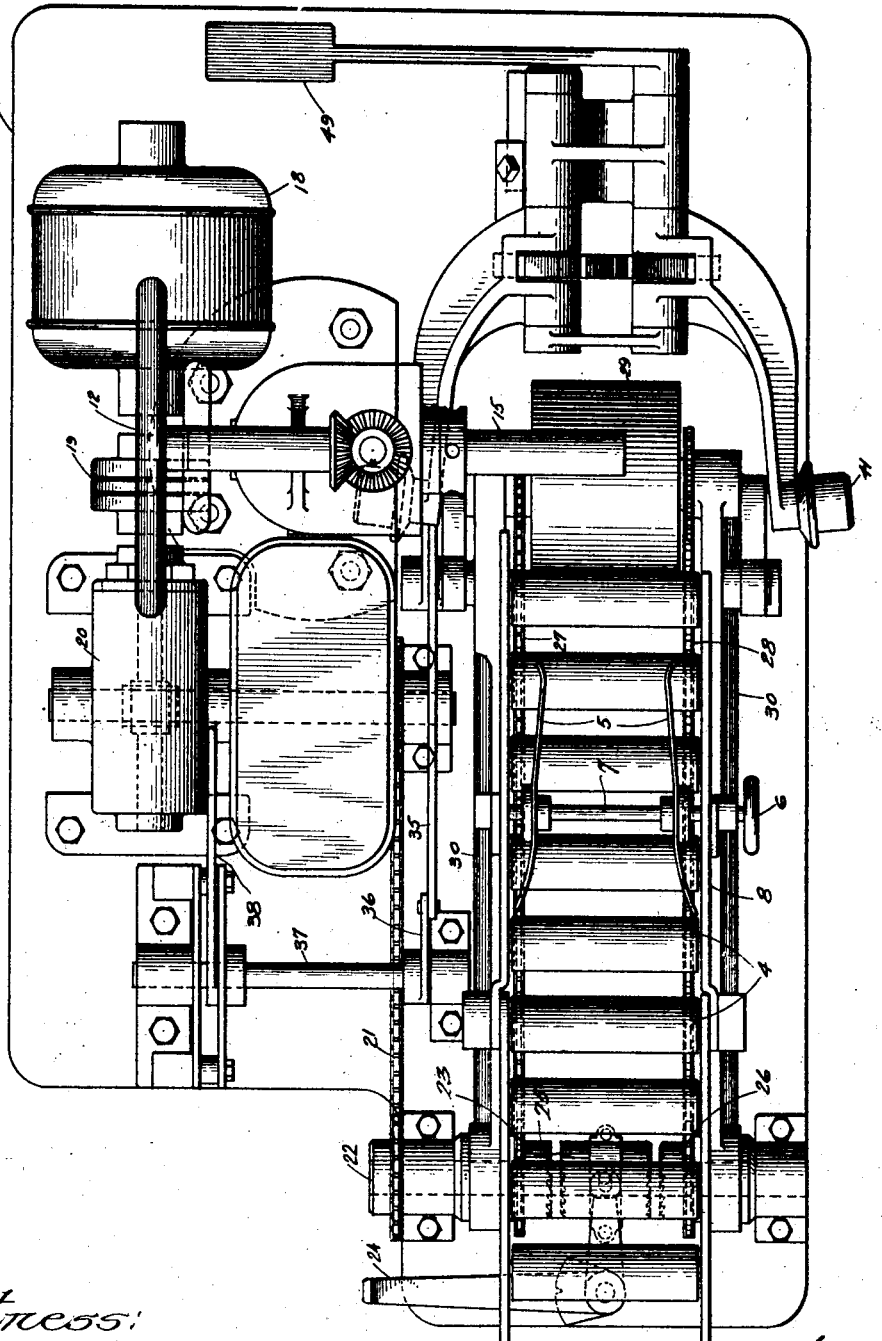

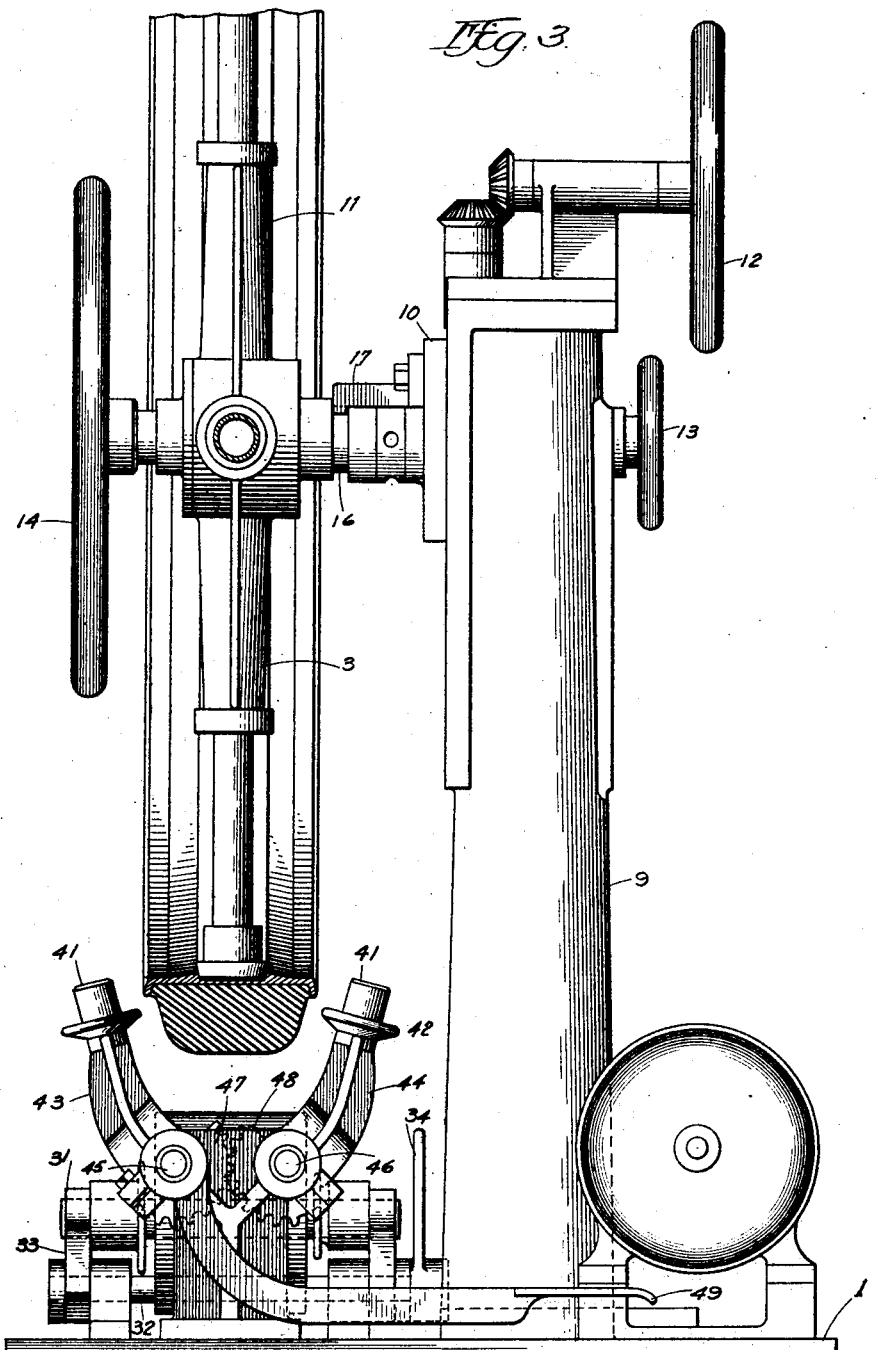

WILLIAM C. STEVENS, OF SUMMIT COUNTY, AND CHARLES W. STEELE, OF AKRON, OHIO, ASSIGNORS TO THE FIRESTONE TIRE & RUBBER COMPANY, OF AKRON, OHIO, A CORPORATION OF OHIO.

MOTOR-TIRE-APPLYING APPARATUS.

1,388,902.  Specification of Letters Patent.  Patented Aug. 30, 1921.

Application filed July 5, 1917. Serial No. 178,837.

*To all whom it may concern:*

Be it known that we, WILLIAM C. STEVENS and CHARLES W. STEELE, citizens of the United States, residing in the county of Summit, and Akron, county of Summit, and State of Ohio, respectively, have invented new and useful Improvements in Motor-Tire-Applying Apparatus, of which the following is a specification.

This invention relates to machines for use in the manufacture of solid tires and particularly of that type of solid tire known as a hard base tire. In a former application of William C. Stevens, Serial No. 146,695, filed Feb. 5, 1917, has been described a method of manufacturing these tires by which the tread portion was extruded through a die in approximately the shape it has when cured, the extruded rubber cut into lengths sufficient to pass around the rim and then the length circled about the rim. The present application relates to improvements in machines for applying the extruded tire to a rim.

By the use of the machine shown and described herein it is possible to quickly and easily apply the cushion tire, after it has been cut to the proper length. A further improvement in the machine is that it closely "stitches" or rolls the cushion tire into the upstanding flanges of the rim.

Other objects and advantages will appear from a perusal of the specification and drawings, as will be readily understood by those skilled in the art. In the drawings like reference numerals refer to like parts, in which drawings:

Figure 1 is a side elevation of the machine, showing a tire applied to a rim.

Fig. 2 is a plan view, and

Fig. 3 is an end elevation partly in section showing more particularly the "stitching" rollers.

Similar to the machine of the former application, this apparatus comprises a trough or runway on which the tire is supported, a stand carrying a spider for holding the rim during the application of a cushion tire, and, if desired, a wrapping supply for a muslin wrapper to be used to hold the tire on the rim, after application if there is a tendency to sag.

The machine base is indicated at 1, and the trough or runway at 2, which is supported at the end near the machine by a standard 3. In the runway are mounted a series of idler rollers 4 which support the cushion tire and allow it to be drawn off on rotation of the rim. At the delivery end of the runway are arranged two guiding fingers 5 which are adjustable for different width tires by means of a hand wheel 6 and shaft 7, as will be readily understood. The forward end 8 of the runway is mounted for movement independent of the remainder, being pivoted at the standard 3, the purpose of which will appear as the description proceeds.

To one side of the pivoted extension 8 of the runway is erected a standard 9 which carries a vertically movable slide 10 on which is supported the adjustable spider 11 on which the rim is mounted. The slide 10 and with it the spider is raised and lowered for adjustment to different sized rims by a hand wheel 12 and locked in position by a second hand wheel 13. The adjustable spider is operated by a wheel 14, when mounting a rim in position or removing a rim after the tire has been applied. The spider 11 may be removed from the shaft 15 carried by the slide, and one of different size substituted if desired, the hub of the spider being provided with a groove 16 and the slide with latch 17 fitting in the groove to hold the spider on the shaft.

Motive power is derived from a motor 18 on the base, through a clutch 19, worm gearing 20 and a drive chain 21 which drives a jack shaft 22 mounted on the base of the machine under the runway. Mounted to slide on the jack shaft is a two-faced clutch member 23 arranged to be shifted by a lever 24 along the shaft, but to turn therewith. Loosely mounted on the shaft 22 at either side of the clutch 23 are opposed clutch faces 25 and 26 carrying sprockets operating chains 27 and 28 which drive a roller 29 mounted directly under the rim carrying spider. The sprockets on the roller 29 are of different diameters so that it is possible to rotate the roller 29 at fast or slow speed as desired.

The roller 29 is the tire applying member which serves to press the cushion tire onto the rim and also to drive the rim by contact with the tire. It is carried in the end of a rocking frame 30 which is pivoted on the shaft 22. The frame carries a roller 31 at one side which is over a shaft 32 mounted for rocking movement on the base 1, the shaft carrying a cam 33 arranged to engage the roller 31. The rear end of the shaft has secured thereto an arm 34, connected to a link 35, pivoted in turn to an arm 36 on a short rocker 37 located at convenient position to the runway and provided with an operating handle. The pivoted extension 8 of the runway carries a downwardly extending lug or ear 39 which rests on the rocking frame 30.

The operation of the machine as far as described may be given at this point. A rim prepared for the reception of the cushion tire, by which is meant that a hard rubber base has been applied and properly cemented and in tacky condition, is mounted on the spider 11. The cushion part of the tire having been cut to proper length is now placed on the feed table or runway 2 the leading end being between the guide fingers 5 which have been set at the proper distance and in alinement with the rim. The operator, who usually stands or sits over the runway 2, advances the end of the tire on to the roller 29 which is normally lowered slightly and is constantly rotated at the slow speed (the lever 24 being thrown into proper position) and immediately pulls the lever 38 toward him which raises the tire applying member 29. As the frame 30 is raised upwardly, the pivoted extension is moved upwardly also due to the contact of the lug 39 with the frame which brings the body of the tire upwardly approximately tangential with the rim and places the guide fingers in proximity to the flanges of the rim guiding the tire into its place. The pulley 29 is maintained elevated until the tire has been placed over three-quarters of the way around the rim, when the pulley is lowered and the rotation of the rim stopped. The operator now picks up the end of the cushion and abuts the two ends of the tire together as shown at 40 in Fig. 1. After the ends of the tire have been placed together they are preferably stitched by a small hand roller and then the roller 29 is again raised and the tire and rim rotated several times or until the cushion is firmly against the hard base of the tire.

The soft rubber cushion may be rolled or packed into intimate contact with the flanges of the rim and for this purpose we provide two stitching rollers which are adapted to roll or press the soft rubber into place and to counteract the tendency of the soft rubber to be forced over the flanges of the rim, upon the application of pressure by the roller 29. These rollers are indicated at 41 and are provided with flanges 42 which contact the rubber. They are mounted to rotate on the ends of rocker arms 43 and 44 secured to shafts 45 and 46 mounted on the base plate. The arms 43 and 44 are articulated by means of mating segmental gears 47 and 48. The shaft 45 has secured thereto a treadle 49 by depression of which the rollers may be forced against the tire. While the operator is rolling the cushion tire firmly in place by the pressure roller 29 his assistant depresses the treadle and stitches the lower sides of the cushion into place.

A supply of muslin or other wrapper is carried at 50 on an arm 51 extending upwardly from the post 9. From this supply a wrapping of suitable thickness may be applied around the tire to prevent sagging of the tire if it is very large or if it is required to stand a long time before being placed in a mold for vulcanization. This comprises a wrapper reel 52 and tensioning pins 53 over which the muslin passes to the tire, and a retarding brake 54 may be used to prevent overruning of the reel. A lever 55 is provided by which the muslin reel may be reciprocated on pins 56 to weave the wrapper back and forth over the tire. During the wrapping the rim and tire may be rotated at increased speed by operation of the lever 24.

It is believed that the operation will have been made clear from the above and it is to be understood that this invention is not limited to the details set forth but obvious changes and modifications may be made within the scope of the same.

We claim:

1. A machine for applying cushion tires to rims comprising a holder for supporting and revolving a rim, a guideway for the cushion tire, a roller adjacent the end of the guideway and the rim and means for moving the roller toward said rim to raise the tire and apply pressure thereon.

2. A machine for applying cushion tires to rims, comprising a rotatable support for a rim, a guideway for the cushion tire adjacent the rim, a pressure roller normally spaced from the rim, and means to move the pressure roller and the lower end of said guideway toward the rim to raise the tire toward the rim.

3. A machine for applying cushion tires to rims, comprising a rotatable support for a rim, a guideway for the cushion tire, and means for moving the guideway toward the rim upon application of the tire.

4. A machine for applying cushion tires to rims, comprising a rotatable support for a rim, a guideway for the cushion tire, guide fingers on said guideway, and means for moving the guideway toward the rim upon application of the tire.

5. A machine for applying cushion tires to rims, comprising a rotatable support for a rim, a guideway for the cushion tire, a pressure roller for rolling the tire in contact with the rim, and means for moving the guideway and the pressure roller toward the rim upon application of the tire.

6. A machine for applying cushion tires to rims comprising a rotatable support for a rim, means for placing the tire about the rim and means for packing the edges of the tire against the rim.

7. A machine for applying cushion tires to rims comprising a support for a rim, means for placing the tire about the rim and a roller for packing the edge of the tire against the rim.

8. A machine for applying cushion tires to rims, comprising a support for a rim, means for placing the tire about the rim, a roller for packing the edge of the tire against the rim and means for moving the roller and the rim relatively to one another.

9. A machine for applying cushion tires to rims, comprising a support for a rim, means for placing the tire about the rim, rollers for packing the edges of the tire against the rim, means for rotating the rim, and pressure applying means for said rollers.

10. A machine for applying cushion tires to rims, comprising a support for a rim, means for placing a tire about the rim and forcing it on to the rim and means for packing the edges of the tire against the rim.

11. A machine for applying cushion tires to rims, comprising a support for a rim, means for rotating the rim, a cushion tire support, means for forcing said tire radially against the rim and drawing it from the support and means acting transversely of the first named means for compacting the sides of the tire.

12. A machine for applying cushion tires to rims, comprising a support for a rim, a roller bearing in the tread of the tire for forcing it into contact with the rim, means for rotating the roller and the rim and rollers acting transversely to said first named roller to prevent distortion of the tire by the first named roller.

13. A machine for applying cushion tires to rims, comprising a support for a rim, a pressure roller, means to rotate the roller and the rim, means to force said pressure roller against the tread of the tire, rollers at the side of said tire and means to force said rollers against said tire at right angles to the movement of the first named roller.

14. A machine for applying cushion tires to rims, comprising a support for a rim, a pressure roller, means to rotate the roller and the rim, means to force said pressure roller against the tread of the tire, rollers at the side of said tire, flanges on said rollers, means to force said flanges against the side of the tire adjacent the rim.

15. A machine for applying cushion tires to rims, comprising a support for a rim, a pressure roller, means to force said pressure roller against the tread of the tire, rollers at the side of said tire, flanges on said rollers, means to force said flanges against the side of the tire adjacent the rim, and means to rotate the pressure roller and the rim.

16. A machine for applying cushion tires to rims comprising a holder for supporting and revolving a rim, a guideway for the cushion tire, a tire supporting roller adjacent the end of the guideway and rim, said guideway and said roller being arranged below the rim and means for moving the roller toward the rim to lift the tire into contact with said rim.

17. A machine for applying cushion tires to rims comprising a rotatable support for carrying and revolving a rim, a guideway for the cushion tire arranged below the rim, a roller adjacent the end of the guideway and normally spaced from the rim a distance greater than the depth of the tire, means for rotating the roller and means for moving the roller toward the rim.

18. A machine for applying cushion tires to rims, comprising a support for revolving a rim, a roller adjacent the rim and adapted to support the leading end of the cushion tire, means for forcing said roller against said rim and driving mechanism connected with said roller for rotating said support upon movement of the roller toward the rim.

19. A machine for applying cushion tires to rims comprising a holder for supporting and revolving a rim, said holder being normally stationary, a guideway for the cushion tire, a tire supporting roller at the end of said guideway adjacent the rim, means for moving said roller toward said rim to apply pressure thereon to force the tire into intimate contact therewith, and driving means adapted to rotate said rim upon pressure being applied to said roller.

20. A machine for applying cushion tires to rims comprising a support for carrying and revolving a rim, said support being freely rotatable, a guideway and roller, said roller being normally spaced from the rim a distance greater than the thickness of the tire, means for moving the roller toward the rim and driving means which becomes active upon pressure being applied to the tire on the rim to rotate the support for the rim.

21. A machine for applying cushion tires to rims comprising a freely rotatable support for carrying a rim, a pressure roller normally spaced from said rim a distance greater than the thickness of said tire, driving mechanism for said pressure roller and means for moving said pressure roller toward the rim to grip the tire between the roller and the rim and rotate the support through the tire.

22. A machine for applying cushion tires to rims comprising a freely rotatable support for carrying a rim, a pressure roller for forcing said tire against said rim normally spaced from the rim, means for revolving said pressure roller, and means for moving said roller toward said rim whereby the rim is rotated through the tire.

WILLIAM C. STEVENS.
CHARLES W. STEELE.